US012422969B2

(12) United States Patent
Golden et al.

(10) Patent No.: US 12,422,969 B2
(45) Date of Patent: Sep. 23, 2025

(54) HEAD-MOUNTED ELECTRONIC DEVICE WITH MAGNIFICATION TOOL

(71) Applicant: Apple Inc., Cupertino, CA (US)

(72) Inventors: Daniel M Golden, Sunnyvale, CA (US); John M Nefulda, Oakville (CA); Joaquim Goncalo Lobo Ferreira da Silva, San Jose, CA (US); Anuj Bhatnagar, San Jose, CA (US); Mark A Ebbole, San Francisco, CA (US); Andrew A Haas, Cupertino, CA (US); Seyedkoosha Mirhosseini, Santa Clara, CA (US); Colin D Munro, San Jose, CA (US)

(73) Assignee: Apple Inc., Cupertino, CA (US)

( * ) Notice: Subject to any disclaimer, the term of this patent is extended or adjusted under 35 U.S.C. 154(b) by 180 days.

(21) Appl. No.: 18/451,787

(22) Filed: Aug. 17, 2023

(65) Prior Publication Data
US 2024/0069688 A1    Feb. 29, 2024

Related U.S. Application Data

(60) Provisional application No. 63/400,211, filed on Aug. 23, 2022.

(51) Int. Cl.
*G06F 3/04815*   (2022.01)
*G06F 3/01*   (2006.01)
(Continued)

(52) U.S. Cl.
CPC .......... *G06F 3/04815* (2013.01); *G06F 3/012* (2013.01); *G06T 19/006* (2013.01);
(Continued)

(58) Field of Classification Search
CPC ................. G06F 3/04815; G06F 3/012; G06F 2203/04805; G06F 2203/04806;
(Continued)

(56) References Cited

U.S. PATENT DOCUMENTS 9,197,864 B1    11/2015   Starner et al.
2019/0138088 A1*  5/2019   Evans .................. H04N 13/344
(Continued)

FOREIGN PATENT DOCUMENTS

| EP | 3396511 A1 | 10/2018 |
| JP | 2019139673 A | 8/2019 |
| WO | 2011060525 A1 | 5/2011 |

*Primary Examiner* — Rodney Amadiz
(74) *Attorney, Agent, or Firm* — Treyz Law Group; Jason Tsai

(57) ABSTRACT

A head-mounted device is provided that includes displays configured to display an image and to simultaneously display a magnifying window that presents a magnified portion of the image. The magnifying window lies in a magnification plane that is fixed relative to a user's head. One or more processors in the head-mounted device can be used to perform a first ray cast operation to identify an input point where a detected user input intersects the magnifying window, to obtain a remapped point from the input point, to compute a directional vector based on the remapped point and a reference point associated with the user's head, to obtain a shifted point by shifting the remapped point from the magnification plane to another plane parallel to the magnification plane, and to perform a second ray cast operation using the shifted point and the directional vector.

16 Claims, 7 Drawing Sheets

(51) Int. Cl.
*G06T 19/00* (2011.01)
*G06T 19/20* (2011.01)

(52) U.S. Cl.
CPC .... *G06T 19/20* (2013.01); *G06F 2203/04805* (2013.01); *G06F 2203/04806* (2013.01); *G06T 2200/24* (2013.01); *G06T 2219/2016* (2013.01)

(58) Field of Classification Search
CPC .... G06F 3/011; G06F 3/04845; G06T 19/006; G06T 19/20; G06T 2200/24; G06T 2219/2016
See application file for complete search history.

(56) References Cited

U.S. PATENT DOCUMENTS

| | | | |
|---|---|---|---|
| 2019/0324530 A1* | 10/2019 | Stellmach | G06F 3/017 |
| 2020/0026413 A1 | 1/2020 | Simpkinson et al. | |
| 2020/0073538 A1 | 3/2020 | Kawashima et al. | |
| 2020/0201521 A1* | 6/2020 | Faulkner | G06F 3/04883 |
| 2020/0273146 A1 | 8/2020 | Burgoyne et al. | |
| 2020/0289934 A1 | 9/2020 | Azmandian et al. | |
| 2021/0312887 A1* | 10/2021 | Griswold | G06T 19/006 |

\* cited by examiner

|     | UNMAGNIFIED CONTENT | MAGNIFIED CONTENT |
| --- | --- | --- |
| (I) | VIRTUAL CONTENT ONLY | VIRTUAL OBJECT(S) |
| (II) | REAL WORLD CONTENT ONLY | REAL WORLD OBJECT(S) |
| (III) | MIXED REALITY CONTENT | VIRTUAL OBJECT(S) ONLY |
| (IV) | MIXED REALITY CONTENT | VIRTUAL AND REAL WORLD OBJECTS |

*FIG. 8*

HEAD-MOUNTED ELECTRONIC DEVICE WITH MAGNIFICATION TOOL

This application claims the benefit of U.S. Provisional Patent Application No. 63/400,211, filed Aug. 23, 2022, which is hereby incorporated by reference herein in its entirety.

FIELD

This relates generally to electronic devices, and, more particularly, to electronic devices such as head-mounted devices.

BACKGROUND

Electronic devices such as head-mounted devices may have one or more displays for presenting images in a display area. A user can provide an input to point to a certain object in the display area. Many widgets or other graphical user interface elements can be included within the display area where the user's input can be used to select a certain widget or a certain graphical user interface element.

The head-mounted device might include a zoom tool for zooming in on a portion of the display area. It can be challenging to accurately map the user's input in the zoomed portion to a corresponding unzoomed object in the display area.

SUMMARY

A head-mounted device may include one or more displays configured to present different types of content to a user. A magnification tool may be used to magnify a portion of the viewing area of the head-mounted device. The user can see unmagnified objects in a three-dimensional scene through the viewing area and can see magnified objects in the three-dimensional scene in a magnifying window in the viewing area. A user input intended for at least one of the magnified objects can be remapped to a corresponding unmagnified object in the three-dimensional scene.

An aspect of the disclosure provides a method of operating a head-mounted device that includes displaying an image in a display area, displaying a magnifying window within the display area, the magnifying window presenting a magnified portion of the image, determining whether an input is intended for the magnifying window, and remapping the input to identify an unmagnified object corresponding to a magnified object at which the input is pointing in the magnifying window. The step of determining whether the input intended for the magnifying window can include performing a first ray cast operation that extends a ray from the input to locate an input point where the ray intersects the magnifying window. The magnified portion of the image can be magnified by a zoom factor, and remapping the input can include obtaining a remapped point by processing the input using inverse magnification rendering operations. The method can further include computing a directional vector based on the remapped point and a reference point such as information relating to a user's head, obtaining a shifted point from the remapped point, performing a second ray cast operation by extending a ray from the shifted point in a direction of the directional vector computed based on the remapped point and the reference point to identify the unmagnified object.

An aspect of the disclosure provides a method of operating a head-mounted device that includes displaying a three-dimensional scene including a magnifying window and at least one object, detecting a user input associated with a first location in the three-dimensional scene corresponding to the magnifying window, and remapping the user input from the first location to a second location in the three-dimensional scene corresponding to the magnifying window based on a level of magnification of the magnifying window. Remapping the user input can include processing the user input using inverse magnification rendering operations. The method can further include computing a directional vector using the second location in the three-dimensional scene corresponding to the magnifying window and a reference point associated with a user's head, obtaining a third location in the three-dimensional scene by shifting the second location in the three-dimensional scene corresponding to the magnifying window from a first plane to a second plane that is parallel to the first plane, an determining whether the user input is intended for the at least one object by extending a ray from the third location in a direction of the computed directional vector.

An aspect of the disclosure provides a head-mounted device that includes one or more displays configured to display an image and to display a magnifying window that magnifies a portion of the image by a magnification factor, an input device configured to detect an input, and one or more processors configured to perform one or more ray cast operations to determine whether the input intersects with the magnifying window and to identify an unmagnified object in the image corresponding to the input. The one or more processors can obtain a remapped point by processing the input using inverse magnification rendering operations, can compute a directional vector based on the remapped point and a user's head, and can obtain a shifted point by shifting the remapped point from a first plane to a second plane parallel to the first plane. The one or more processors can perform the second ray cast operation by extending a ray from the shifted point in a direction of the computed directional vector.

BRIEF DESCRIPTION OF THE DRAWINGS

FIG. 8 is a table showing the types of content that can be presented in a magnifying window in accordance with some embodiments.

DETAILED DESCRIPTION

An electronic device such as a head-mounted device may have a front face that faces away from a user's head and may have an opposing rear face that faces the user's head. One or more displays may be used to provide images in a display area to a user's eyes. A portion of the image in the display area may be magnified using a magnifying tool. The magnifying tool presents a magnified view of objects in the magnified portion of the image within a magnifying window. The objects displayed within the magnifying window can be magnified in accordance with a magnification factor.

The device may detect a user input point within the magnifying window. The detected user input point may be processed using inverse magnification rendering operations to obtain a remapped point. The device may then compute a directional vector based the user's head position to the remapped point. The device may then perform a final ray cast operation from a shifted remapped point using the computed directional vector to identify a visually correct location in the unmagnified space. Operated in this way, the user's input within the magnifying window can be correctly mapped to the target location in the unzoomed space while taking in account depth information.

Figure 1:
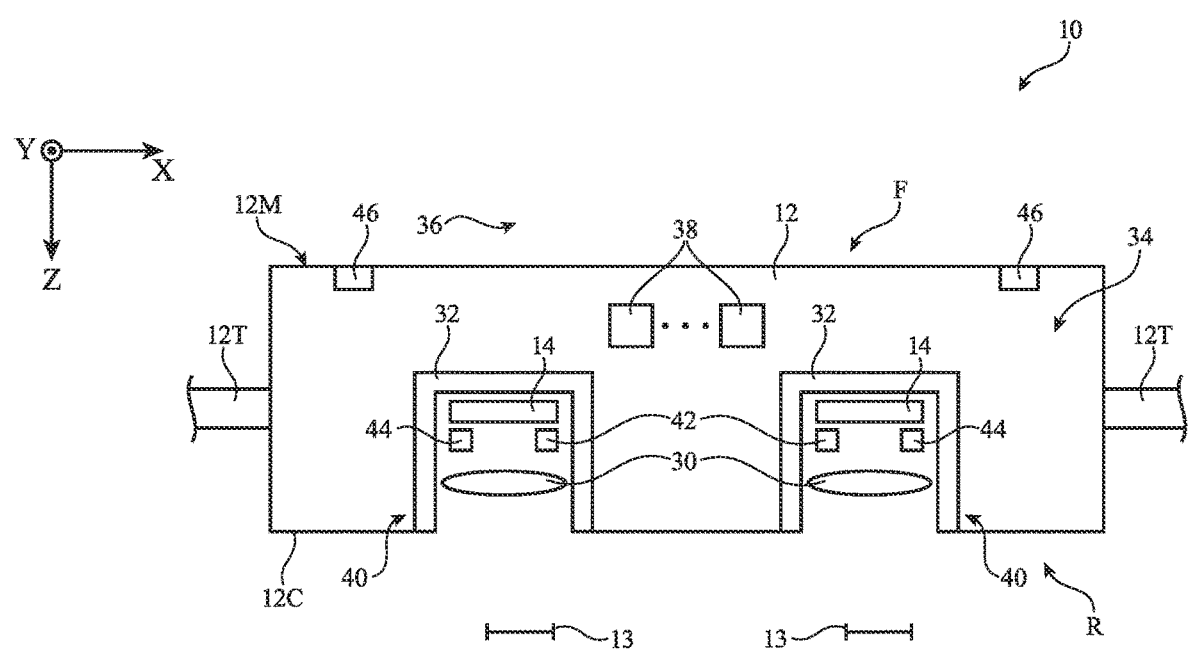
FIG. 1 is a top view of an illustrative head-mounted device in accordance with some embodiments.

A top view of an illustrative head-mounted device is shown in FIG. 1. As shown in FIG. 1, head-mounted devices such as electronic device 10 may have head-mounted support structures such as housing 12. Housing 12 may include portions (e.g., head-mounted support structures 12T) to allow device 10 to be worn on a user's head. Support structures 12T may be formed from fabric, polymer, metal, and/or other material. Support structures 12T may form a strap or other head-mounted support structures to help support device 10 on a user's head. A main support structure (e.g., a head-mounted housing such as main housing portion 12M) of housing 12 may support electronic components such as displays 14.

Main housing portion 12M may include housing structures formed from metal, polymer, glass, ceramic, and/or other material. For example, housing portion 12M may have housing walls on front face F and housing walls on adjacent top, bottom, left, and right side faces that are formed from rigid polymer or other rigid support structures, and these rigid walls may optionally be covered with electrical components, fabric, leather, or other soft materials, etc. Housing portion 12M may also have internal support structures such as a frame (chassis) and/or structures that perform multiple functions such as controlling airflow and dissipating heat while providing structural support.

The walls of housing portion 12M may enclose internal components 38 in interior region 34 of device 10 and may separate interior region 34 from the environment surrounding device 10 (exterior region 36). Internal components 38 may include integrated circuits, actuators, batteries, sensors, and/or other circuits and structures for device 10. Housing 12 may be configured to be worn on a head of a user and may form glasses, spectacles, a hat, a mask, a helmet, goggles, and/or other head-mounted device. Configurations in which housing 12 forms goggles may sometimes be described herein as an example.

Front face F of housing 12 may face outwardly away from a user's head and face. Opposing rear face R of housing 12 may face the user. Portions of housing 12 (e.g., portions of main housing 12M) on rear face R may form a cover such as cover 12C (sometimes referred to as a curtain). The presence of cover 12C on rear face R may help hide internal housing structures, internal components 38, and other structures in interior region 34 from view by a user.

Device 10 may have one or more cameras such as cameras 46 of FIG. 1. Cameras 46 that are mounted on front face F and that face outwardly (towards the front of device 10 and away from the user) may sometimes be referred to herein as forward-facing or front-facing cameras. Cameras 46 may capture visual odometry information, image information that is processed to locate objects in the user's field of view (e.g., so that virtual content can be registered appropriately relative to real-world objects), image content that is displayed in real time for a user of device 10, and/or other suitable image data. For example, forward-facing (front-facing) cameras may allow device 10 to monitor movement of the device 10 relative to the environment surrounding device 10 (e.g., the cameras may be used in forming a visual odometry system or part of a visual inertial odometry system). Forward-facing cameras may also be used to capture images of the environment that are displayed to a user of the device 10. If desired, images from multiple forward-facing cameras may be merged with each other and/or forward-facing camera content can be merged with computer-generated content for a user.

Device 10 may have any suitable number of cameras 46. For example, device 10 may have K cameras, where the value of K is at least one, at least two, at least four, at least six, at least eight, at least ten, at least 12, less than 20, less than 14, less than 12, less than 10, 4-10, or other suitable value. Cameras 46 may be sensitive at infrared wavelengths (e.g., cameras 46 may be infrared cameras), may be sensitive at visible wavelengths (e.g., cameras 46 may be visible cameras), and/or cameras 46 may be sensitive at other wavelengths. If desired, cameras 46 may be sensitive at both visible and infrared wavelengths.

Device 10 may have left and right optical modules 40. Optical modules 40 support electrical and optical components such as light-emitting components and lenses and may therefore sometimes be referred to as optical assemblies, optical systems, optical component support structures, lens and display support structures, electrical component support structures, or housing structures. Each optical module may include a respective display 14, lens 30, and support structure such as support structure 32. Support structure 32, which may sometimes be referred to as a lens support structure, optical component support structure, optical module support structure, or optical module portion, or lens barrel, may include hollow cylindrical structures with open ends or other supporting structures to house displays 14 and lenses 30. Support structures 32 may, for example, include a left lens barrel that supports a left display 14 and left lens 30 and a right lens barrel that supports a right display 14 and right lens 30.

Displays 14 may include arrays of pixels or other display devices to produce images. Displays 14 may, for example, include organic light-emitting diode pixels formed on substrates with thin-film circuitry and/or formed on semiconductor substrates, pixels formed from crystalline semiconductor dies, liquid crystal display pixels, scanning display devices, and/or other display devices for producing images.

Lenses 30 may include one or more lens elements for providing image light from displays 14 to respective eyes boxes 13. Lenses may be implemented using refractive glass lens elements, using mirror lens structures (catadioptric lenses), using Fresnel lenses, using holographic lenses, and/or other lens systems.

When a user's eyes are located in eye boxes 13, displays (display panels) 14 operate together to form a display for device 10 (e.g., the images provided by respective left and right optical modules 40 may be viewed by the user's eyes in eye boxes 13 so that a stereoscopic image is created for the user). The left image from the left optical module fuses with the right image from a right optical module while the display is viewed by the user.

It may be desirable to monitor the user's eyes while the user's eyes are located in eye boxes 13. For example, it may be desirable to use a camera to capture images of the user's irises (or other portions of the user's eyes) for user authentication. It may also be desirable to monitor the direction of the user's gaze. Gaze tracking information may be used as a form of user input and/or may be used to determine where, within an image, image content resolution should be locally enhanced in a foveated imaging system. To ensure that device 10 can capture satisfactory eye images while a user's eyes are located in eye boxes 13, each optical module 40 may be provided with a camera such as camera 42 and one or more light sources such as light-emitting diodes 44 or other light-emitting devices such as lasers, lamps, etc. Cameras 42 and light-emitting diodes 44 may operate at any suitable wavelengths (visible, infrared, and/or ultraviolet). As an example, diodes 44 may emit infrared light that is invisible (or nearly invisible) to the user. This allows eye monitoring operations to be performed continuously without interfering with the user's ability to view images on displays 14.

Figure 2:
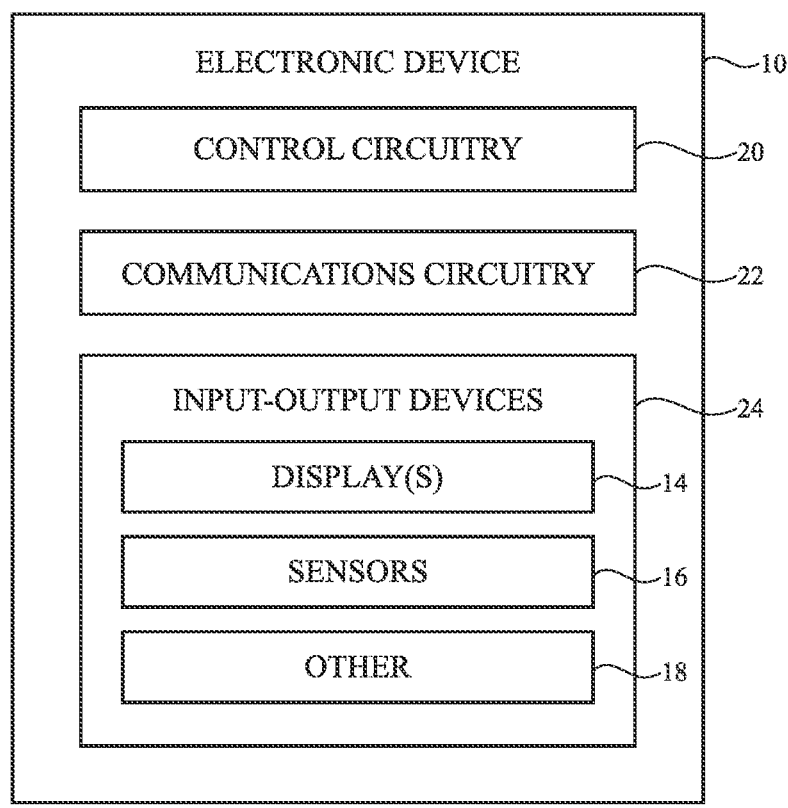
FIG. 2 is a schematic diagram of an illustrative head-mounted device in accordance with some embodiments.

A schematic diagram of an illustrative electronic device such as a head-mounted device or other wearable device is shown in FIG. 2. Device 10 of FIG. 2 may be operated as a stand-alone device and/or the resources of device 10 may be used to communicate with external electronic equipment. As an example, communications circuitry in device 10 may be used to transmit user input information, sensor information, and/or other information to external electronic devices (e.g., wirelessly or via wired connections). Each of these external devices may include components of the type shown by device 10 of FIG. 2.

As shown in FIG. 2, a head-mounted device such as device 10 may include control circuitry 20. Control circuitry 20 may include storage and processing circuitry for supporting the operation of device 10. The storage and processing circuitry may include storage such as nonvolatile memory (e.g., flash memory or other electrically-programmable-read-only memory configured to form a solid state drive), volatile memory (e.g., static or dynamic random-access-memory), etc. One or more processors in control circuitry 20 may be used to gather input from sensors and other input devices and may be used to control output devices. The processing circuitry may be based on one or more processors such as microprocessors, microcontrollers, digital signal processors, baseband processors and other wireless communications circuits, power management units, audio chips, application specific integrated circuits, etc. During operation, control circuitry 20 may use display(s) 14 and other output devices in providing a user with visual output and other output. Control circuitry 20 may be configured to perform operations in device 10 using hardware (e.g., dedicated hardware or circuitry), firmware, and/or software. Software code for performing operations in device 10 may be stored on storage circuitry (e.g., non-transitory (tangible) computer readable storage media that stores the software code). The software code may sometimes be referred to as program instructions, software, data, instructions, or code. The stored software code may be executed by the processing circuitry within circuitry 20.

To support communications between device 10 and external equipment, control circuitry 20 may communicate using communications circuitry 22. Circuitry 22 may include antennas, radio-frequency transceiver circuitry, and other wireless communications circuitry and/or wired communications circuitry. Circuitry 22, which may sometimes be referred to as control circuitry and/or control and communications circuitry, may support bidirectional wireless communications between device 10 and external equipment (e.g., a companion device such as a computer, cellular telephone, or other electronic device, an accessory such as a point device or a controller, computer stylus, or other input device, speakers or other output devices, etc.) over a wireless link.

For example, circuitry 22 may include radio-frequency transceiver circuitry such as wireless local area network transceiver circuitry configured to support communications over a wireless local area network link, near-field communications transceiver circuitry configured to support communications over a near-field communications link, cellular telephone transceiver circuitry configured to support communications over a cellular telephone link, or transceiver circuitry configured to support communications over any other suitable wired or wireless communications link. Wireless communications may, for example, be supported over a Bluetooth® link, a WiFi® link, a wireless link operating at a frequency between 10 GHz and 400 GHz, a 60 GHz link, or other millimeter wave link, a cellular telephone link, or other wireless communications link. Device 10 may, if desired, include power circuits for transmitting and/or receiving wired and/or wireless power and may include batteries or other energy storage devices. For example, device 10 may include a coil and rectifier to receive wireless power that is provided to circuitry in device 10.

Device 10 may include input-output devices such as devices 24. Input-output devices 24 may be used in gathering user input, in gathering information on the environment surrounding the user, and/or in providing a user with output. Devices 24 may include one or more displays such as display(s) 14. Display(s) 14 may include one or more display devices such as organic light-emitting diode display panels (panels with organic light-emitting diode pixels formed on polymer substrates or silicon substrates that contain pixel control circuitry), liquid crystal display panels, microelectromechanical systems displays (e.g., two-dimensional mirror arrays or scanning mirror display devices), display panels having pixel arrays formed from crystalline semiconductor light-emitting diode dies (sometimes referred to as microLEDs), and/or other display devices.

Sensors 16 in input-output devices 24 may include force sensors (e.g., strain gauges, capacitive force sensors, resistive force sensors, etc.), audio sensors such as microphones, touch and/or proximity sensors such as capacitive sensors such as a touch sensor that forms a button, trackpad, or other input device), and other sensors. If desired, sensors 16 may include optical sensors such as optical sensors that emit and detect light, ultrasonic sensors, optical touch sensors, optical proximity sensors, and/or other touch sensors and/or proximity sensors, monochromatic and color ambient light sensors, image sensors (e.g., cameras), fingerprint sensors, iris scanning sensors, retinal scanning sensors, and other biometric sensors, temperature sensors, sensors for measuring three-dimensional non-contact gestures ("air gestures"), pressure sensors, sensors for detecting position, orientation, and/or motion of device 10 and/or information about a pose of a user's head (e.g., accelerometers, magnetic sensors such as compass sensors, gyroscopes, and/or inertial measurement units that contain some or all of these sensors), health sensors such as blood oxygen sensors, heart rate sensors, blood flow sensors, and/or other health sensors, radio-frequency sensors, three-dimensional camera systems such as depth sensors (e.g., structured light sensors and/or depth sensors based on stereo imaging devices that capture three-dimensional images) and/or optical sensors such as self-mixing sensors and light detection and ranging (lidar) sensors that gather time-of-flight measurements (e.g., time-of-flight cameras), humidity sensors, moisture sensors, gaze tracking sensors, electromyography sensors to sense muscle activation, facial sensors, and/or other sensors. In some arrangements, device 10 may use sensors 16 and/or other input-output devices to gather user input. For example, buttons may be used to gather button press input, touch sensors overlapping displays can be used for gathering user touch screen input, touch pads may be used in gathering touch input, microphones may be used for gathering audio input (e.g., voice commands), accelerometers may be used in monitoring when a finger contacts an input surface and may therefore be used to gather finger press input, etc.

If desired, electronic device 10 may include additional components (see, e.g., other devices 18 in input-output devices 24). The additional components may include haptic output devices, actuators for moving movable housing structures, audio output devices such as speakers, light-emitting diodes for status indicators, light sources such as light-emitting diodes that illuminate portions of a housing and/or display structure, other optical output devices, and/or other circuitry for gathering input and/or providing output. Device 10 may also include a battery or other energy storage device, connector ports for supporting wired communication with ancillary equipment and for receiving wired power, and other circuitry.

Figure 3:
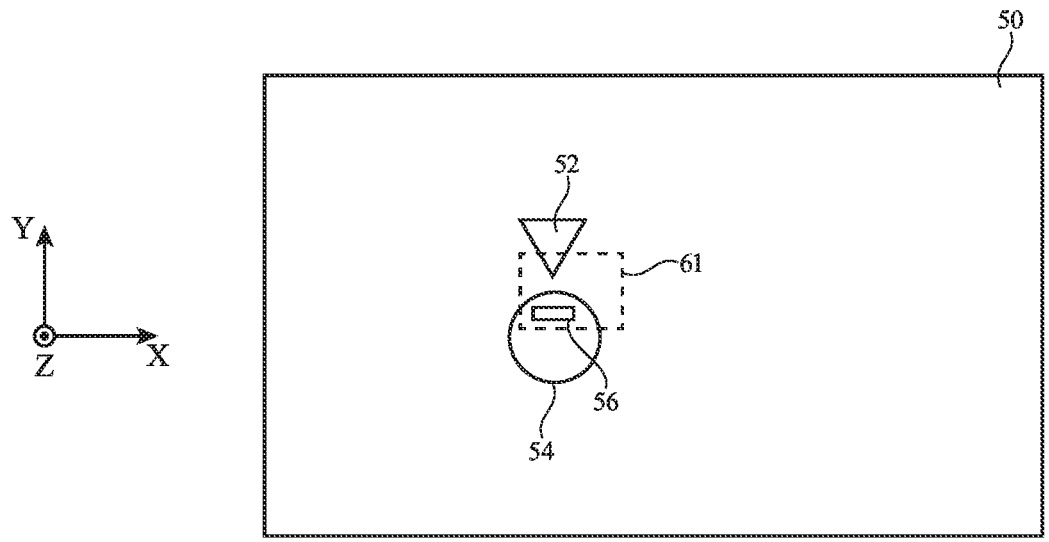
FIG. 3 is a diagram showing how a portion of an illustrative display area can be selected for magnification in accordance with some embodiments.

Display(s) 14 can be used to present a variety of content to a user's eye. The left and right displays 14 that are used to present a fused stereoscopic image to the user's eyes when viewing through eye boxes 13 can sometimes be referred to collectively as a display 14. FIG. 3 is a diagram of a display area such as display area 50 of display 14. Display area 50 is sometimes referred to an active area or a viewing area of display 14. Various types of content can be presented within display area 50. A three-dimensional scene can be displayed within the display area 50. As an example, virtual reality (VR) content can be presented within display area 50. Virtual reality content may refer to content that only includes virtual objects within a virtual reality (computer-generated) environment. As another example, mixed reality (MR) content can be presented within display area 50. Mixed reality content may refer to content that includes virtual objects and real objects from the real world physical environment in which device 10 is being operated. As another example, only real world content can be presented within display area 50. The real world content may refer to images being captured by one or more front-facing cameras (see, e.g., cameras 46 in FIG. 1) and passed through as a live feed to the user. The real world content being presented on display area 50 is therefore sometimes referred to as a camera passthrough feed.

Regardless of the type of content that is being presented on display area 50, the displayed content can include one or more objects. In the example of FIG. 3, exemplary objects such as a first object 52 and a second object 54 can be displayed on area 50. A graphical user interface (GUI) element such as element 56 may be located within object 54. User interface element 56 can represent one or more buttons, one or more check boxes, one or more toggles, one or more text boxes, one or more message boxes, one or more search fields, one or more sliders, one or more dropdown lists, one or more icons, one or more tabs, one or more widgets, a combination of these elements, and/or other user interface elements. In general, a substantial amount of content can be simultaneously presented on display area 50.

To help alleviate the user's eye strain especially when the resolution of display 14 is high, device 10 can be provided with a magnifying tool for zooming in a on a certain portion of the display area. The magnifying tool is sometimes referred to as a zoom tool. When the magnifying tool is turned on, the magnifying tool can be used to zoom in on any portion of display area 50 such as portion 61 in the example FIG. 3. Portion 61 is sometimes referred to as a magnified portion. Magnified portion 61 can be moved to any location within display area 50 in the XY direction. Magnified portion 61 can be moved by repositioning the user's head (e.g., the target area of the magnification tool may be locked to the user's head), can be moved based on the user's gaze, can be moved based on the user's gesture, can be moved based on inputs from a controller or other input devices, or can be moved based on other types of user input(s).

Figure 4:
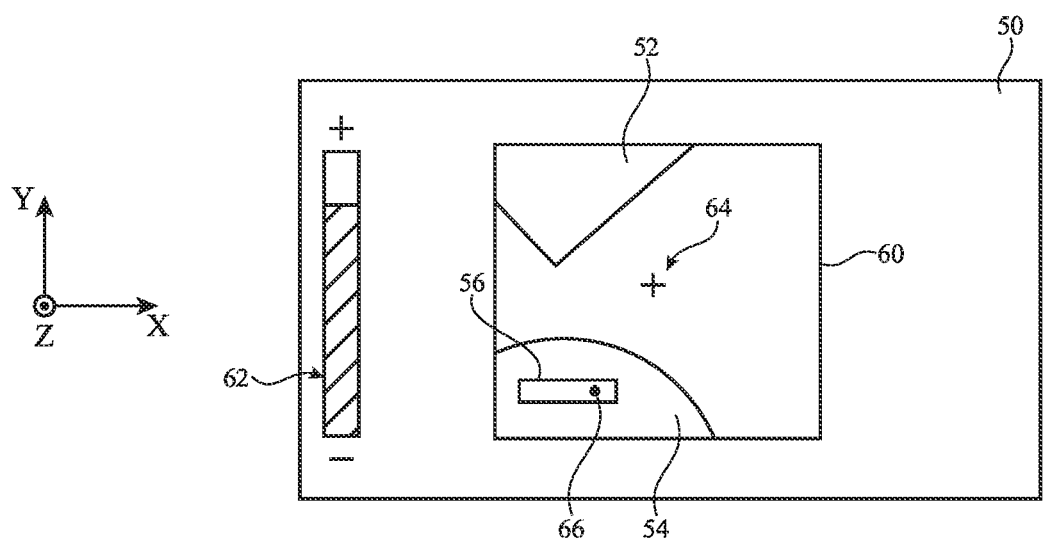
FIG. 4 is a diagram showing an illustrative magnifying window within a display area in accordance with some embodiments.

FIG. 4 is a diagram showing an illustrative magnifying window such as magnifying window 60 that can be displayed within area 50. Magnifying window 60 may represent or can be defined as a graphical user interface (GUI) window within which the magnified content in portion 61 of FIG. 3 is displayed (as an example). Magnifying window 60 is sometimes referred to as a magnification window or a zoom (or zooming) window. As shown in the example of FIG. 4, a lower portion of object 52 and an upper portion of object 54 (which also includes element 56) can be displayed in magnifying window 60. Marker 64 represents the center of magnifying window 60. Moving portion 61 around as described above will allow magnifying window 60 display magnified versions of different portions of display area 50.

The amount of magnification provided by the magnifying tool may be adjustable. The amount of magnification can be shown using a magnification indicator such as indictor 62. Magnification indicator 62, sometimes referred to as a zoom indicator, may have an upper zoom limit and a lower zoom limit. The upper zoom limit may be set to provide a 10× zoom factor (e.g., where the content within window 60 is magnified by 10 times), a 20× zoom factor (e.g., where the content within window 60 is magnified by 20 times, a 10-20× zoom factor, a 5-10× zoom factor, a 2-5× zoom factor, or more than 20× zoom factor. The lower zoom limit may be set to provide a 1× zoom factor (e.g., where the content is not magnified), a 2× zoom factor (e.g., where the content within window is only magnified by 2 times), a 1-2× zoom factor, a 2-5× zoom factor, or less than 2× zoom factor. The zoom factor is sometimes referred to as the level of magnification.

The size of magnifying window 60 on display area 50 when the magnification tool is enabled may be fixed. As a result, by zooming in or increasing the zoom factor, the magnification tool is effectively reducing the size of the magnified portion 61 so that a larger version of the target object(s) is shown within a smaller portion 61. Conversely, by zooming out or decreasing the zoom factor, the magnification tool is effectively increasing the size of the magnified portion 61 so that a smaller version of the target object(s) is shown within a larger portion 61. The example of FIG. 4 in which magnifying window 60 is positioned in the center of display area 50 is merely illustrative. As another example, magnifying window 60 can be positioned closer to the left edge of area 50. As another example, magnifying window 60 can be positioned closer to the right edge of area 50. As another example, magnifying window 60 can be positioned towards one of the corners within display area 50.

Device 10 may allow a user to provide an input for making a selection on display area 50. In the example of FIG. 4, the user may provide an input at location 66 to select graphical user interface element 56 within the magnifying window 60. Since location 66 corresponds to a location within the magnified window 60, device 10 will need to locate a corresponding point or object in the unmagnified space to determine the actual object or element being selected by the user. If care is not taken, location 66 can be mapped to an incorrect location or object in the unzoomed space.

Figure 7:
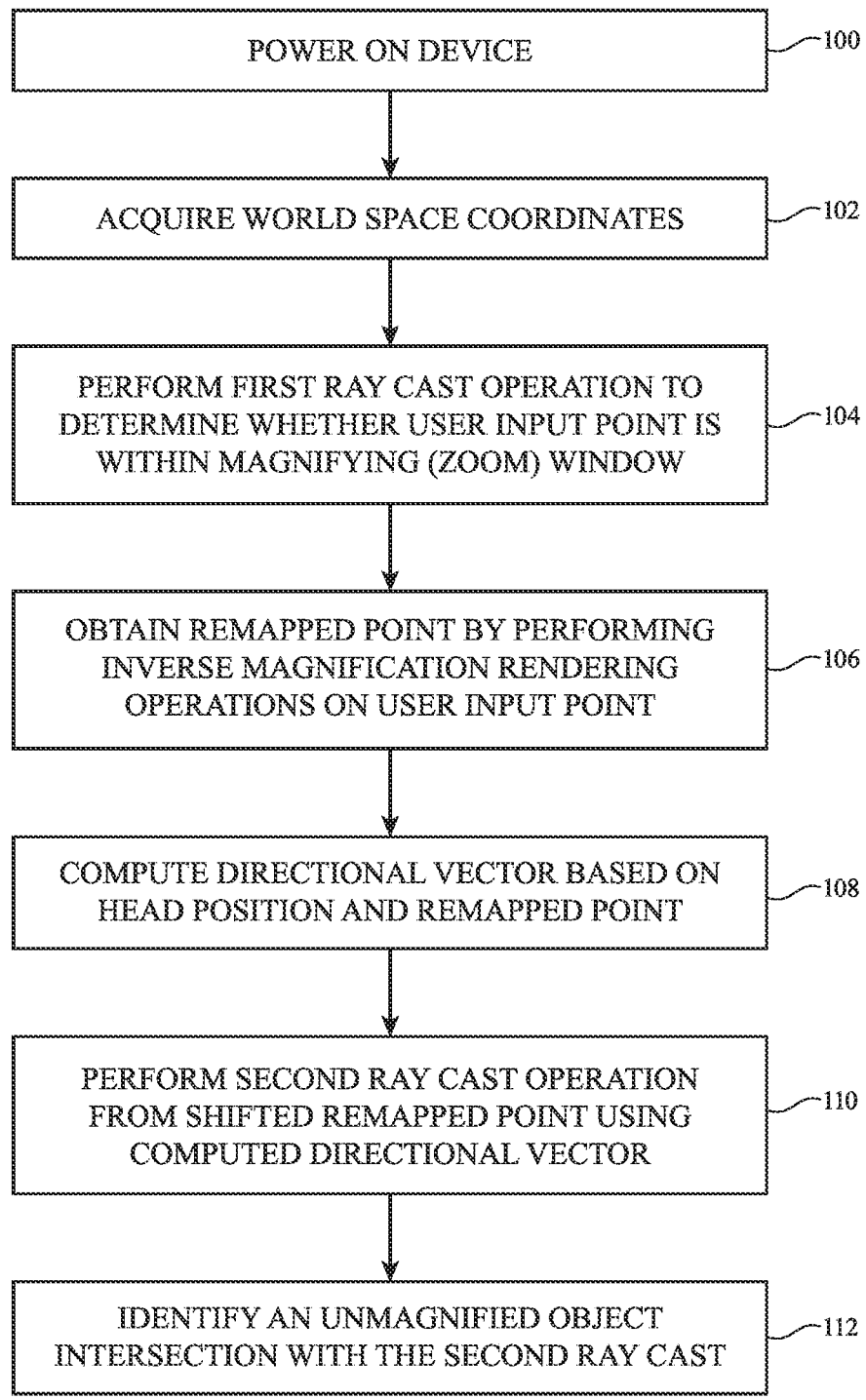
FIG. 7 is a flow chart of illustrative operations for detecting a user input within a magnifying window and for determining a corresponding input target in the display area in accordance with some embodiments.

FIG. 7 is a flow chart of illustrative operations for detecting a user input point within magnifying window 60 and for correctly mapping the detected user input point to a corresponding object in the unzoomed space. The operations of FIG. 7 can be performed using control circuitry 20 (see, e.g., FIG. 2, using one or more processors within circuitry 20). At step 100, device 10 can be turned on. A power-on sequence can be performed to initialize device 10 to a default or known state.

During the operations of block 102, device 10 may be configured to acquire world space coordinates. The world space coordinates may be defined with respect to a global or world Cartesian 3-dimensional coordinate system. The world Cartesian 3D coordinate system has an origin (center point) sometimes referred to as the "world origin," where all world space coordinates are defined with respect to the world origin. The world origin has the coordinates (0,0,0). In one embodiment, the world origin can be set as the location of device 10 when it is powered on. If desired, the world origin can be set to any other location such as the location device 10 was manufactured. In general, the world origin can be fixed or can be reset periodically or in response to certain events such as a power cycle event. Any spatial movement of device 10 will change its world space coordinates relative to the world origin.

Figure 5:
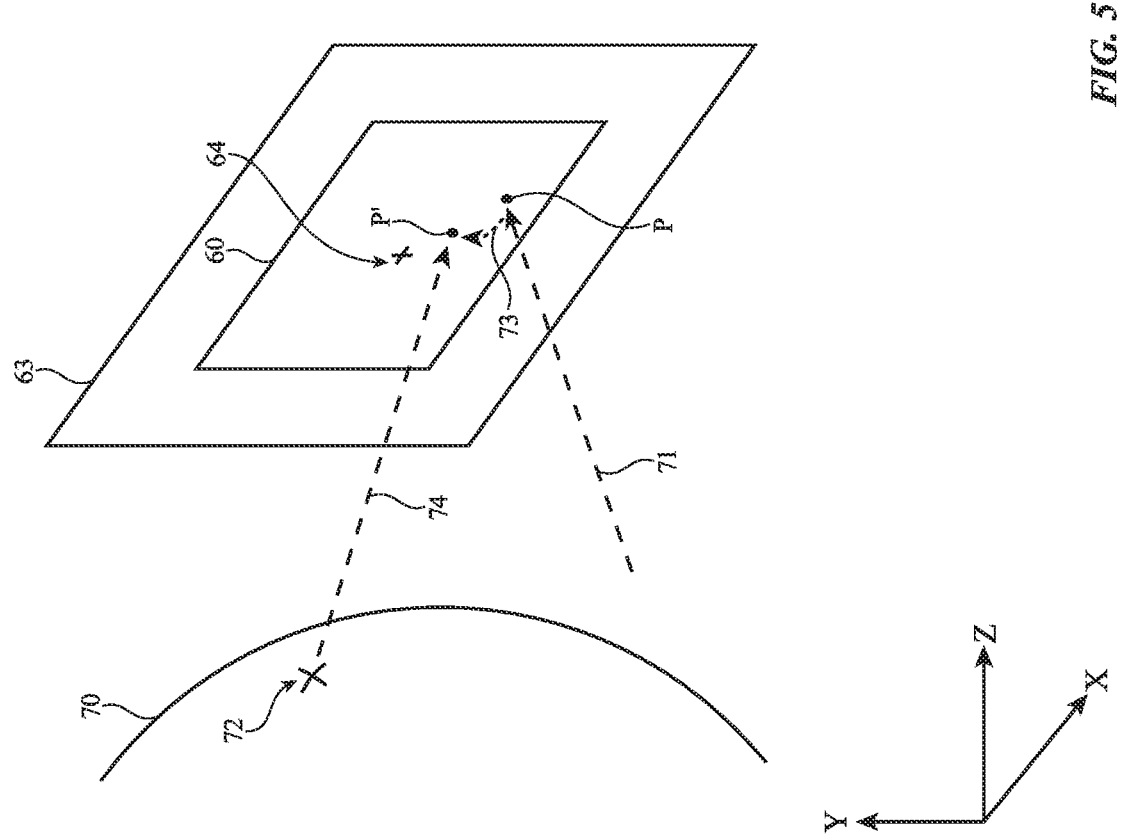
FIG. 5 is a perspective view showing a user input point within a magnifying window and a corresponding remapped input point in accordance with some embodiments.

During the operations of block 104, device 10 may perform a first ray cast operation to determine whether a user input point is within the magnifying window. FIG. 5 is a perspective view showing a user's head such as head 70 and showing a user input point such as input point P lying within magnifying window 60. As shown in the perspective view of FIG. 5, magnifying window 60 may lie within a magnification plane 63. The magnification plane 63 may be fixed relative to the user's head 70 (e.g., the magnification plane is a head-locked plane). In other words, as the user turns his/her head, magnification plane 63 will turn, rotate, or move following the movement of head 70. Regardless of the movement of magnification plane 63, magnifying window 60 can be repositioned anywhere within magnification plane 63. Display area 50 may reside in a display plane that presents unmagnified objects in an unzoomed space or a 3-dimensional scene.

Arrow 71 in FIG. 5 illustrates the first ray cast operation. Ray cast 71 is used to determine whether the input P is destined or intended for magnifying window 60. Input point P may have XY coordinates relative to the center of the magnifying window (see center 64). Center 64 is sometimes referred to as a magnifying window origin. This input ray can be based on the user's gaze, a head position, a wrist location, a finger location, a finger pinch location, a hand location, an input on a track pad, an input from a controller, a combination of these inputs, and/or other types of user input. The first ray cast operation may find where the user input ray intersects with the magnification plane 63. If ray 71 intersects with magnification plane 63 within the magnifying window 60 (as shown by user input intersection point P), then input point P will have to be remapped to find the corresponding unmagnified object since the magnified object directly behind point P in the display area is not the same as the object being pointed at by point P as shown in magnifying window 60. If desired, hit testing operations and/or collision detection operations can also be performed during the operations of block 104 to determine whether user input point P lies within the magnifying window.

During the operations of block 106, the user input point P can be further processed to obtain a corresponding remapped point P'. To display the magnified contents in the magnifying window 60, a virtual content compositor in a separate display pipeline of device 10 may perform a series of processes (sometimes referred to and defined herein as "magnification rendering operations") to map unmagnified content from display area 50 to magnified content in the magnifying window 60 within plane 63. The magnification rendering operations can be based on the zoom factor, the user's input point, the user's point of gaze, the magnifying window origin/center, a depth of the object(s)/content being magnified, some combination of these factors, and/or other parameters associated with the user, the content being displayed, or the magnification tool. The magnification rendering operations can, based on these parameters, scale, shift, or otherwise rotate the content in the display area 50 to output the magnified content to be displayed within window 60. The depth of the object(s)/content being magnified can be dynamically adjusted or can vary over time to help adjust for potential double vision issues associated with a stereoscopic display. As such, the magnified contents can be updated whenever the depth parameter is being adjusted.

In order to map the user input point P in the magnifying window 60 to a corresponding point in the display area 50, an inverse of the magnification rendering operations can be applied to input point P to obtain remapped point P', as indicated by arrow 73. The inverse magnification rendering operations can therefore scale, shift, or otherwise rotate the user input point P in a reverse manner to identify the corresponding remapped point P'. In other words, the remapped point P' can be obtained by processing the input point P based on the magnification rendering operations If the depth parameter is dynamically updated to address double vision issues as discussed above, the remapped point P' can also be adjusted accordingly in real time.

This example in which the user input point is remapped to point P' using inverse/reverse magnification rendering operations is illustrative. In another embodiment, the user input point P may be scaled down by the current zoom factor relative to the center of the magnifying window to obtain a remapped point (see, e.g., remapped point P'). In FIG. 5, consider a scenario where the zoom factor is currently set equal to two and where input point P has exemplary XY coordinates (40, -40) relative to center 64. Center 64 is sometimes referred to as a magnifying window origin. The coordinates (40, -40) of point P can be scaled down by a factor of two to generate corresponding remapped coordinates (20, -20) for remapped point P'. The zoom factor is sometimes referred to as the zoom scale. This example in which the zoom (magnification) factor is equal to two is merely illustrative. In general, the current zoom factor can be set to any numerical value. The coordinates of the remapped point P' described above is expressed as being relative to the magnifying window origin 64. If desired, the coordinates of the remapped point P' can be converted to world space coordinates (e.g., 2D or 3D coordinates relative to the world origin obtained during the operations of block 102). Remapped point P' is sometimes referred to herein as a scaled point or a remapped location in the 3D scene.

During the operations of block 108, device 10 may compute a directional vector based on the user's head position and the remapped point. In the example of FIG. 5, device 10 may compute a directional vector 74 from a center 72 of the user's head (e.g., a midpoint between the user's eyes) to remapped point P'. The remapped point P' has the coordinates determined from the operations of block 106. Center point 72 can, for example, be determined by using rear-facings cameras or other sensors to compute an inter-pupillary distance between the user's eyes and then compute a midpoint of the interpupillary distance.

As another example, center point 72 can simply be a predetermined reference point from a given central point within device 10. Other ways of determining center point 72 can be employed. A simple vector calculation can be used to compute the directional vector from these two endpoints. Computing a directional vector in this way based on the user's head position and the remapped point is exemplary. In another embodiment, the directional vector can be computed based on the user's head position and the original input point P. In another embodiment, the directional vector can be computed based on the user's head position and the window center point 64. In another embodiment, the directional vector can be computed based on some body part of the user (e.g., based on one or both of the user's eye or some other reference point) and either the remapped point P', original input point P, or window center point 64. If desired, the directional vector can be expressed using world space coordinates.

Figure 6:
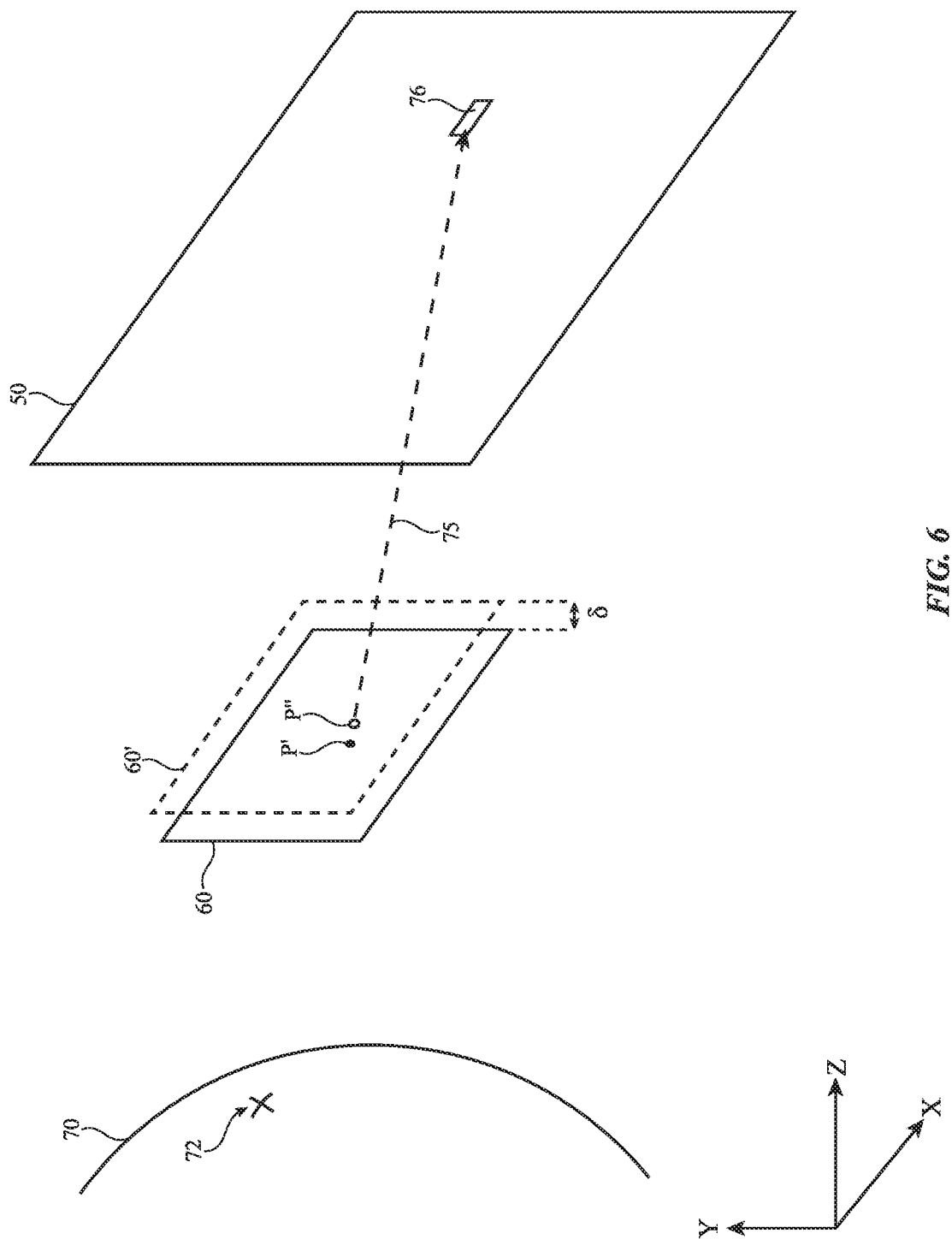
FIG. 6 is a perspective view showing how the remapped input point shown in FIG. 5 can be used to identify a corresponding unmagnified object in the display area in accordance with some embodiments.

During the operations of block 110, device 10 may perform a second ray cast operation that extends from a shifted remapped point in a direction of the vector computed from the operations of block 108. FIG. 6 is a perspective view showing how the remapped input point P' can be used to identify a corresponding unmagnified object 76 in the unzoomed space or the 3D scene. First, a shifted remapped point P''' can be computed from remapped point P'. As shown in FIG. 6, shifted remapped point P''' (sometimes referred to as a shifted point) corresponds to the remapped point lying in a plane 60' that is parallel to magnifying window 60 but slightly shifted forward in the Z direction. The amount of shift δ can be expressed in units of the world coordinates and can have a relatively small value that is less than 1, less than 0.1, less than 0.01, less than 0.001, less than 0.0001, or other small value. Performing the second ray cast operation from point P''' in a slightly shifted plane can help avoid a positive hit result on the magnifying window itself while still accurately returning the visually correct location in the unzoomed space. In some embodiments, computation of shifted point P''' may be optional. If desired, the second ray cast operation can optionally stem from remapped point P'.

Arrow 75 in FIG. 6 illustrates the second ray cast operation. Ray cast 75 originates from the shifted point P''' and extends out in the direction of the vector computed from step 108. The second ray cast operation may locate or identify a corresponding object such as user interface element 76 in the unzoomed space by finding the intersection point of ray 75 and display area 50 (see, e.g., the operations of block 112). The object identified by ray 75 may generally represent an object in 3D space, a 2D plane, a sphere, a cube, a figure, or other spatial construct. The object identified by the second ray cast operation is sometimes referred to as an unmagnified object, which can be a virtual object, a real-world object, or other item in the unmagnified space.

FIG. 8 is a table showing the types of content that can be presented in magnifying window 60. Row (I) represents a first scenario where display 14 presents only virtual content. In other words, a user of device 10 will be immersed in a virtual environment. In such scenarios, only virtual objects can be displayed within magnifying window 60. Row (II) represents a second scenario where display 14 presents only real world content (i.e., by displaying a pass-through video feed captured using the front-facing cameras or by displaying pre-recorded videos or images of real-world objects). In such scenarios, only real world objects can be displayed within magnifying window 60. Row (III) represents a third scenario where display 14 presents mixed reality content (e.g., content that might include both virtual objects and physical real world objects). In such scenarios, perhaps only virtual objects (but not the real word objects) will be magnified or displayed within the magnifying window. Row (IV) represents a fourth scenario where display 14 presents mixed reality content. In the scenario of row IV, perhaps both virtual objects and real word objects will be magnified or displayed within the magnifying window.

The methods and operations described above in connection with FIGS. 1-8 may be performed by the components of device 10 using software, firmware, and/or hardware (e.g., dedicated circuitry or hardware). Software code for performing these operations may be stored on non-transitory computer readable storage media (e.g., tangible computer readable storage media) stored on one or more of the components of device 10 (e.g., the storage circuitry within control circuitry 20 of FIG. 1). The software code may sometimes be referred to as software, data, instructions, program instructions, or code. The non-transitory computer readable storage media may include drives, non-volatile memory such as non-volatile random-access memory (NVRAM), removable flash drives or other removable media, other types of random-access memory, etc. Software stored on the non-transitory computer readable storage media may be executed by processing circuitry on one or more of the components of device 10 (e.g., one or more processors in control circuitry 20). The processing circuitry may include microprocessors, application processors, digital signal processors, central processing units (CPUs), application-specific integrated circuits with processing circuitry, or other processing circuitry.

As described above, one aspect of the present technology is the gathering and use of information such as information from input-output devices. The present disclosure contemplates that in some instances, data may be gathered that includes personal information data that uniquely identifies or can be used to contact or locate a specific person. Such personal information data can include demographic data, location-based data, telephone numbers, email addresses, twitter ID's, home addresses, data or records relating to a user's health or level of fitness (e.g., vital signs measurements, medication information, exercise information), date of birth, username, password, biometric information, or any other identifying or personal information.

The present disclosure recognizes that the use of such personal information, in the present technology, can be used to the benefit of users. For example, the personal information data can be used to deliver targeted content that is of greater interest to the user. Accordingly, use of such personal information data enables users to calculated control of the delivered content. Further, other uses for personal information data that benefit the user are also contemplated by the present disclosure. For instance, health and fitness data may be used to provide insights into a user's general wellness, or may be used as positive feedback to individuals using technology to pursue wellness goals.

The present disclosure contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. Such policies should be easily accessible by users, and should be updated as the collection and/or use of data changes. Personal information from users should be collected for legitimate and reasonable uses of the entity and not shared or sold outside of those legitimate uses. Further, such collection/sharing should occur after receiving the informed consent of the users. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations. For instance, in the United States, collection of or access to certain health data may be governed by federal and/or state laws, such as the Health Insurance Portability and Accountability Act (HIPAA), whereas health data in other countries may be subject to other regulations and policies and should be handled accordingly. Hence different privacy practices should be maintained for different personal data types in each country.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, the present technology can be configured to allow users to select to "opt in" or "opt out" of participation in the collection of personal information data during registration for services or anytime thereafter. In another example, users can select not to provide certain types of user data. In yet another example, users can select to limit the length of time user-specific data is maintained. In addition to providing "opt in" and "opt out" options, the present disclosure contemplates providing notifications relating to the access or use of personal information. For instance, a user may be notified upon downloading an application ("app") that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing specific identifiers (e.g., date of birth, etc.), controlling the amount or specificity of data stored (e.g., collecting location data at a city level rather than at an address level), controlling how data is stored (e.g., aggregating data across users), and/or other methods.

Therefore, although the present disclosure broadly covers use of information that may include personal information data to implement one or more various disclosed embodiments, the present disclosure also contemplates that the various embodiments can also be implemented without the need for accessing personal information data. That is, the various embodiments of the present technology are not rendered inoperable due to the lack of all or a portion of such personal information data.

Physical environment: A physical environment refers to a physical world that people can sense and/or interact with without aid of electronic systems. Physical environments, such as a physical park, include physical articles, such as physical trees, physical buildings, and physical people. People can directly sense and/or interact with the physical environment, such as through sight, touch, hearing, taste, and smell.

Computer-generated reality: In contrast, a computer-generated reality (CGR) environment refers to a wholly or partially simulated environment that people sense and/or interact with via an electronic system. In CGR, a subset of a person's physical motions, or representations thereof, are tracked, and, in response, one or more characteristics of one or more virtual objects simulated in the CGR environment are adjusted in a manner that comports with at least one law of physics. For example, a CGR system may detect a person's head turning and, in response, adjust graphical content and an acoustic field presented to the person in a manner similar to how such views and sounds would change in a physical environment. In some situations (e.g., for accessibility reasons), adjustments to characteristic(s) of virtual object(s) in a CGR environment may be made in response to representations of physical motions (e.g., vocal commands). A person may sense and/or interact with a CGR object using any one of their senses, including sight, sound, touch, taste, and smell. For example, a person may sense and/or interact with audio objects that create 3D or spatial audio environment that provides the perception of point audio sources in 3D space. In another example, audio objects may enable audio transparency, which selectively incorporates ambient sounds from the physical environment with or without computer-generated audio. In some CGR environments, a person may sense and/or interact only with audio objects. Examples of CGR include virtual reality and mixed reality.

Virtual reality: A virtual reality (VR) environment refers to a simulated environment that is designed to be based entirely on computer-generated sensory inputs for one or more senses. A VR environment comprises a plurality of virtual objects with which a person may sense and/or interact. For example, computer-generated imagery of trees, buildings, and avatars representing people are examples of virtual objects. A person may sense and/or interact with virtual objects in the VR environment through a simulation of the person's presence within the computer-generated environment, and/or through a simulation of a subset of the person's physical movements within the computer-generated environment.

Mixed reality: In contrast to a VR environment, which is designed to be based entirely on computer-generated sensory inputs, a mixed reality (MR) environment refers to a simulated environment that is designed to incorporate sensory inputs from the physical environment, or a representation thereof, in addition to including computer-generated sensory inputs (e.g., virtual objects). On a virtuality continuum, a mixed reality environment is anywhere between, but not including, a wholly physical environment at one end and virtual reality environment at the other end. In some MR environments, computer-generated sensory inputs may respond to changes in sensory inputs from the physical environment. Also, some electronic systems for presenting an MR environment may track location and/or orientation with respect to the physical environment to enable virtual objects to interact with real objects (that is, physical articles from the physical environment or representations thereof). For example, a system may account for movements so that a virtual tree appears stationery with respect to the physical ground. Examples of mixed realities include augmented reality and augmented virtuality.

Augmented reality: An augmented reality (AR) environment refers to a simulated environment in which one or more virtual objects are superimposed over a physical environment, or a representation thereof. For example, an electronic system for presenting an AR environment may have a transparent or translucent display through which a person may directly view the physical environment. The system may be configured to present virtual objects on the transparent or translucent display, so that a person, using the system, perceives the virtual objects superimposed over the physical environment. Alternatively, a system may have an opaque display and one or more imaging sensors that capture images or video of the physical environment, which are representations of the physical environment. The system composites the images or video with virtual objects, and presents the composition on the opaque display. A person, using the system, indirectly views the physical environment by way of the images or video of the physical environment, and perceives the virtual objects superimposed over the physical environment. As used herein, a video of the physical environment shown on an opaque display is called "pass-through video," meaning a system uses one or more image sensor(s) to capture images of the physical environment, and uses those images in presenting the AR environment on the opaque display. Further alternatively, a system may have a projection system that projects virtual objects into the physical environment, for example, as a hologram or on a physical surface, so that a person, using the system, perceives the virtual objects superimposed over the physical environment. An augmented reality environment also refers to a simulated environment in which a representation of a physical environment is transformed by computer-generated sensory information. For example, in providing pass-through video, a system may transform one or more sensor images to impose a select perspective (e.g., viewpoint) different than the perspective captured by the imaging sensors. As another example, a representation of a physical environment may be transformed by graphically modifying (e.g., enlarging) portions thereof, such that the modified portion may be representative but not photorealistic versions of the originally captured images. As a further example, a representation of a physical environment may be transformed by graphically eliminating or obfuscating portions thereof.

Augmented virtuality: an augmented virtuality (AV) environment refers to a simulated environment in which a virtual or computer generated environment incorporates one or more sensory inputs from the physical environment. The sensory inputs may be representations of one or more characteristics of the physical environment. For example, an AV park may have virtual trees and virtual buildings, but people with faces photorealistically reproduced from images taken of physical people. As another example, a virtual object may adopt a shape or color of a physical article imaged by one or more imaging sensors. As a further example, a virtual object may adopt shadows consistent with the position of the sun in the physical environment.

Hardware: there are many different types of electronic systems that enable a person to sense and/or interact with various CGR environments. Examples include head mounted systems, projection-based systems, heads-up displays (HUDs), vehicle windshields having integrated display capability, windows having integrated display capability, displays formed as lenses designed to be placed on a person's eyes (e.g., similar to contact lenses), headphones/earphones, speaker arrays, input systems (e.g., wearable or handheld controllers with or without haptic feedback), smartphones, tablets, and desktop/laptop computers. A head mounted system may have one or more speaker(s) and an integrated opaque display. Alternatively, a head mounted system may be configured to accept an external opaque display (e.g., a smartphone). The head mounted system may incorporate one or more imaging sensors to capture images or video of the physical environment, and/or one or more microphones to capture audio of the physical environment. Rather than an opaque display, a head mounted system may have a transparent or translucent display. The transparent or translucent display may have a medium through which light representative of images is directed to a person's eyes. The display may utilize digital light projection, OLEDs, LEDs, µLEDs, liquid crystal on silicon, laser scanning light sources, or any combination of these technologies. The medium may be an optical waveguide, a hologram medium, an optical combiner, an optical reflector, or any combination thereof. In one embodiment, the transparent or translucent display may be configured to become opaque selectively. Projection-based systems may employ retinal projection technology that projects graphical images onto a person's retina. Projection systems also may be configured to project virtual objects into the physical environment, for example, as a hologram or on a physical surface.

The foregoing is merely illustrative and various modifications can be made to the described embodiments. The foregoing embodiments may be implemented individually or in any combination.

What is claimed is:

1. A method of operating a head-mounted device, comprising:
  displaying an image in a display area;
  displaying a magnifying window within the display area, the magnifying window presenting a magnified portion of the image;
  performing magnification rendering operations to generate the magnified portion of the image;
  determining whether an input is intended for the magnifying window by performing a first ray cast operation that extends a ray from the input to locate an input point where the ray intersects the magnifying window; and
  remapping the input to identify an unmagnified object corresponding to a magnified object at which the input is pointing in the magnifying window, wherein remapping the input comprises obtaining a remapped point by processing the input point in accordance with an inverse of the magnification rendering operations.

2. The method of claim 1, further comprising:
  computing a directional vector based on the remapped point and a reference point.

3. The method of claim 2, wherein the magnifying window and the remapped point lie in a first plane, the method further comprising:
obtaining a shifted point from the remapped point, the shifted point lying in a second plane parallel to the first plane.

4. The method of claim 3, wherein the first plane is fixed with respect to a head of a user of the head-mounted device.

5. The method of claim 3, further comprising:
performing a second ray cast operation by extending a ray from the shifted point in a direction of the directional vector computed based on the remapped point and the reference point to identify the unmagnified object.

6. The method of claim 1, further comprising:
computing a directional vector based on the remapped point and information relating to a head of a user of the head-mounted device.

7. The method of claim 1, further comprising:
displaying a magnified version of only virtual objects within the magnifying window.

8. The method of claim 1, further comprising:
displaying a magnified version of a virtual object and a real world object within the magnifying window.

9. A method of operating a head-mounted device, comprising:
displaying a three-dimensional scene, including a magnifying window and at least one object;
performing magnification rendering operations to generate a magnified version of the at least one object in the magnifying window;
detecting a user input associated with a first location in the three-dimensional scene corresponding to the magnifying window; and
remapping the user input from the first location to a second location in the three-dimensional scene corresponding to the magnifying window based on a depth of the at least one object, wherein remapping the user input comprises processing the first location in accordance with an inverse of the magnification rendering operations that are a function of the depth of the at least one object.

10. The method of claim 9, further comprising:
computing a directional vector using the second location in the three-dimensional scene corresponding to the magnifying window and a reference point associated with a head of a user of the head-mounted device.

11. The method of claim 10, further comprising:
obtaining a third location in the three-dimensional scene by shifting the second location in the three-dimensional scene corresponding to the magnifying window from a first plane to a second plane that is parallel to the first plane.

12. The method of claim 11, further comprising:
determining whether the user input is intended for the at least one object by extending a ray from the third location in a direction of the computed directional vector.

13. A head-mounted device comprising:
one or more displays configured to display an image and to display a magnifying window that magnifies a portion of the image by a magnification factor;
an input device configured to detect an input; and
one or more processors configured to;
performing magnification rendering operations to render the magnified portion of the image displayed in the magnifying window;
perform one or more ray cast operations to determine whether the input intersects with the magnifying window; and
identify an unmagnified object in the image corresponding to the input by obtaining a remapped point by performing an inverse of the magnification rendering operations on the detected input.

14. The head-mounted device of claim 13, wherein the one or more processors is configured to:
perform a first ray cast operation to determine whether the input intersects with the magnifying window and to identify an input point on the magnifying window; and
perform a second ray cast operation, based on a shifted point, to identify the unmagnified object in the image corresponding to the input, wherein the remapped point lies in a first plane, and wherein the shifted point lies in a second plane parallel to the first plane.

15. The head-mounted device of claim 14, wherein the one or more processors is further configured to compute a directional vector based on the remapped point and a head of a user of the head-mounted device.

16. The head-mounted device of claim 15, wherein:
the magnifying window lies in the first plane; and
the one or more processors is configured to perform the second ray cast operation by extending a ray from the shifted point in a direction of the computed directional vector.

* * * * *